United States Patent Office 3,240,556
Patented Mar. 15, 1966

3,240,556
PROCESS FOR THE RECOVERY OF METAL VALUES
Roshan B. Bhappu, Socorro, N. Mex., assignor to The Regents, New Mexico Institute of Mining and Technology, Socorro, N. Mex.
No Drawing. Filed Apr. 11, 1961, Ser. No. 102,144
6 Claims. (Cl. 23—14.5)

This invention relates to a metallurgical process for the recovery of metals from pulps and solutions.

The present invention is adapted for application where metal values are recovered by less economical methods, where metal values are being lost due to inefficient processing, and where recovery of metal values has not been attempted for the reason that it has been impractical. Materials from which metal values may be economically recovered according to this invention include unfiltered, unclarified, and unclassified ore-leached pulps, plating wastes, and other difficult-to-treat metal-containing substances.

It is recognized that ion exchange systems have been employed in the recovery of metal ions from clear solutions and unclarified liquors containing small percentage of fine gangue solids (generally finer than 325 mesh). In such systems, use is generally made of a stationary or a moving bed of ion exchange resin and the clear solutions or unclarified liquors containing the metal values are brought into contacting relationship with the resin whereby the metal ions substitute onto the resin for separation. Such ion exchange processes are limited to use with clear solutions or unclarified liquors containing a low percentage of very fine solids (gangue slimes), such as less than 10% by weight solids. Attempts have been made, for example, in uranium processing, to use resin-in-pulp techniques, which attempts have proven unsatisfactory when more than about 10% fine solids were contained in the slimy uranium-rich liquor. In order to obtain such liquors with less than 10% slimes from leached pulps containing about 60% solids, elaborate physical plant facilities and complicated flowsheet design, accompanied by close supervision and high production cost have been required.

It is also recognized that the process of flotation has also been employed in the recovery of mineral or metal particles from its ores but such processes have been more or less limited to the procedures wherein it is the ore itself which is subject to flotation for physical concentration or for separation of the particles of valuable constituents from the gangue particles.

It is an object of this invention to provide a new and improved metallurgical process for metal recovery.

Another object of this invention is to provide a process for use in the recovery of metals not heretofore recoverable by economical methods or where such recovery has not heretofore been attempted on a commercial scale.

A further object of this invention is to provide a method for recovery of metal ions wherein the gangue solids in the pulp may exceed the particle size and the amount heretofore found to be impractical for processing by ion exchange means, and it is a related object to provide a process which makes use of ion exchange with pulps or slurries containing high percentage of gangue solids and yet provides for efficient and effective recovery of the metal values.

These and other objects and advantages of this invention will hereinafter appear and it will be understood that the specific embodiments which are hereinafter presented are given by way of illustration, and not by way of limitation.

Briefly described, the concepts of this invention are embodied in a new combination which makes use of both ion exchange and froth floation procedures but wherein the ion exchange resin functions to attract the metal ions whereby the latter cling onto the surfaces thereof while in the solution or other aqueous medium and the flotation is employed to remove the metal-bearing exchange resins from the pulps or solutions. This process differs from normal flotation procedures in which the flotation is addressed to chemically unaltered valuable metal or mineral particles present in the ore-pulp. The flotation is effected by employing appropriate flotation reagents (collectors or promoters, frothers, conditioning agents, etc.), adapted to provide the froth in the form of a resin concentrate. This concentrate, after suitable elution and regeneration, which may be carried out in another flotation circuit, is recirculated to the leaching-ion exchange state of the process, thus operating the process on a continuous basis.

In accordance with this invention, cationic exchange resins containing sulphonate, carboxylate, phenolate or other negative groups are collected and floated from the pulp by employing cationic-amine type collectors and cationic surface-active type promoters containing active amine groups, using conventional flotation procedures.

On the other hand, anionic exchange resins containing active ammonium or other positive groups are collected and floated from the pulp by anionic-sulphonate type collectors and anionic surface-active type promoters containing active sulphonate groups.

The particular collectors and promoters employed which cooperate with the ion exchange resins in the recovery of the metal values are characterized by the manner in which they react with respect to the exchange resins and the leaching solution. Cationic exchange resins containing negatively charged sulphonate, carboxylate or phenolate groups attract the positively charged ammonium ($NR_3^+$) active group of the amine-type cationic collectors. This results in the concentration of the positively charged $NR_3^+$ groups on the surface of the cationic exchange resins and since the active $NR_3^+$ group of the cationic-amine type collector is always accompanied by the nonpolar hydrocarbon tail which exhibits strong water-repellency and thus air-avidity, such collector coated exchange resins are readily floated when the air or other gaseous bubbles are introduced in the pulp. The force responsible for this concentration of the oppositely charged active groups is probably electrostatic and accounts for the presence of relatively strong bond at the surface of the resins.

Similarly, the anionic exchange resins containing positively charged ammonium ($NR_3^+$) groups attract the negatively charged sulphonate ($SO_3^-$) groups of the collectors and result in the concentration of the oppositely charged particles on the surface of the exchange resins. Here again, the nonpolar hydrocarbon tail is available for easy pick-up by the gaseous bubbles.

The degree of ionization and the relative magnitude of the charges on the active groups of the collectors and the exchange resins play a very important part in this process. Thus, the cationic collectors such as of the amine-type, and the anionic collectors such as of the sulphonate type, show very high ionization under nearly all pH conditions and are found to be excellent collectors, while all other collectors which show medium to poor ionization are poor collectors.

Likewise, of the cationic exchange resins, those containing active sulphonate groups show good flotability under all pH conditions because the pKa range (pH where 50 percent ionization occurs) for sulphonate-type cation resins occurs at low pH values. On the other hand, for the carboxylic-type cation exchange resins, the pKa range is about 7 and such resins show good flotability only about pH 8.5. Moreover, the polarity of the negatively charged sulphonate active group is much stronger than the carboxylate or phenolate groups and the sulphonate groups show more surface activity than the other two.

In the case of the anionic exchange resins, the strong base quaternary amines show good flotability under all pH conditions while the weak base polyamine type resins, due to their pKb range below 7, show good flotability only below pH 5.0.

The size of the exchange resin particles is not as critical in this process as it is in the typical resin-in-pulp procedures that require a relatively coarse closely sized range, such as 10 to 20 mesh. It is possible to float unsized resin particles effectively from below 8 mesh up to a size at which the resin beads lose their normal physical characteristics (400 mesh in most cases). The finer the size, the greater the physical stability of the resins and the greater the efficiency of a given volume of resin due to decrease in the time required for the resin to reach equilibrium in the loading and elution cycles.

The amounts of collectors required for the flotation of the exchange resins vary from .01 to 1.0 pound per ton of resins floated depending upon the amount of detrimental gangue slimes contained in the pulps. The finer sizes of resins, below 400 mesh, require correspondingly larger amounts of collectors and a longer time of flotation. It is desirable to make use of a frother, such as pine oil or Dow Froth 250, in small amounts, such as .05–0.15 pound per ton of solution, to create desirable froth conditions. A little neutral oil, such as kerosene, is sometimes desirable to stabilize the froth conditions.

Testwork has also indicated that the presence of excessive amounts of gangues slimes may show detrimental effect on flotation of the exchange resins due to consumption of collectors by these gangue slimes. However, this difficulty is overcome by increasing the amounts of collectors. In some cases, the increase of collector resulted in slightly dirty resin concentrator, but it was possible to clean such concentrates by subjecting the rougher concentrate to a cleaner float. Addition of organic slime depressants such as starch, glue, and cellulose was also found effective for controlling the gangue slimes; however, sodium silicate (a general inorganic slime depressant) was harmful to flotation of resins.

The present invention is applicable to all metal values which are capable of recovery from a pulp, waste material or the like, in ionic form by means of ion exchange resins. Table I illustrates non-limiting examples of the conditions under which they are susceptible to recovery according to this process.

TABLE I

*Example of Ion Exchange Applications*

| Metal | Ionic Character | Conditions |
| --- | --- | --- |
| Gold | $Au(CN)_2^-$ | Cyanided pulp. |
| Silver | $Ag(CN)_2^-$ | Cyanided pulp, plating wastes. |
| Copper | $Cu(NH)_2^{++}$ | Cuprammonium rayon wastes. |
|  | $Cu^{++}$ | Ore leaching, mine solutions. |
| Zinc | $Zn(CN)_2^-$ | Alkaline plating waste. |
|  | $Zn^{++}$ | Acid rayon wastes, ore leaching. |
| Tin | $SnO_3^-$ | Alkaline plating rinse water. |
| Tungsten | $WoO_3^-$ | Tungstate salt solutions. |
| Molybdenum | $Mo(O_3)^-$ | Salt solutions, ore leaching. |
| Vanadium | $VO_3^-$ | Ore leaching, $H_3PO_4$ solution. |
| Cobalt | $Co^{++}$ | Ore leaching, Reineckes salts. |
| Nickel | $Ni^{++}$ | Acid plating rinse, ore leaching. |
| Chromium | $CrO_4^{--}$, $Cr_2O_7^{--}$ | Plating rinse, strong $CrO_3$ solution. |
| Thorium | $Th^{++++}$ | Ore leaching, elution with citrate complexes. |
| Selenium | $Se^{++++}$ | Ore leaching. |
| Uranium | $[UO_2(SO_4)_3]^{-4}$ | Ore leaching, R-I-P process. |
|  | $[UO_2(CO_3)_3]^{-4}$ | Ore leaching, R-I-P process. |

Applications which are of particular economic interest at present include uranium extraction, using an anionic exchanger; gold extraction, using an anionic exchanger; and copper, nickel, and cobalt extractions, using cationic exchangers.

A specific example of the inventive process includes the treating of masses containing uranyl sulphate anion $[UO_2(SO_4)_3]^{-4}$ as occurs in acid leaching, or the treatment of uranyl carbonate anion $[UO_2(CO_3)_3]^{-4}$ as occurs in caustic leaching of uranium ores. Introduction of strongly basic (quaternary amine) anion-exchanger of the alkyl amine type, for example, Rohm & Haas Co.s' Amberlite IRA-400, in a conventional manner into the leached unclassified pulps will result in an ion exchange reaction with respect to the uranium radicals. The addition of about 0.2 lb. per ton of resin content of the pulp of an anionic sulphonate collector or promoter, for example, American Cyanamid Co.s' Aero Promoter 801, will result in the flotation of the resins containing the uranium values. A frother, such as pine oil or Dow Froth 250, is added in small amounts (0.10 lb. per ton solution) to create the desirable froth conditions. Likewise, a little fuel oil, such as kerosene, is sometimes desirable to stabilize the froth conditions.

The recovery of an anionic gold cyanide $[Au(CN)_2]^{-2}$ complex is effected in a manner substantially similar to that set forth above; however, in this case a weakly basic anionic exchanger, for example, Dow Chemical Co.'s Dowex 3, employed in a conventional fashion is utilized for absorbing gold cyanide ions from cyanided pulp. As a specific example of a collector which will effect flotation, American Cyanamid Company's Aero Promoter 825 is added in the amount of about 0.10 lb. per ton of resin content of the pulp and the recovery of complex results.

Where it is desired to recover $Cu(NH)_2^{+2}$ as occurs in difficult-to-treat rayon wastes or $Cu^{+2}$ as occurs in acid leaching of copper ores, sulphonated cationic exchangers of the cross-linked polystyrene copolymer types, for example, Rohm & Haas Company's Amberlite IR-120, Permutit Company's Permutit Q, or Dow Chemical Company's Dowex 50, are employed in a conventional fashion. The addition, in an amount of about .05 lb. per ton of resin content of the pulp, of a cationic collector or promoter, such as a higher molecular weight aliphatic amine containing at least one alkyl group having 8 to 22 carbon atoms, for example, Armour Chemical Company's Armac T, General Mills Company's Alamac 26, or American Cyanamid Company's Aeromine 3035 Promoter, will afford flotation according to the principles of this invention. As noted in the foregoing examples, frothing agents and the like will be added as in ordinary practice.

The following specific examples of the practice of this invention are given by way of illustration, but not by way of limitation:

*Example 1*

The extraction of copper from a copper oxide ore containing 0.32% copper using a cation exchange resin:

1200 grams of ore are ground in a rod mill for reduction to 35 mesh. The ground material is leached at 35% solids and at 1.8 pH with 25 lbs. per ton of sulfuric acid. Leaching is continued for one hour in a Fagergren flotation machine. Under these conditions, about 96% of the copper is leached from the ore.

To the leached pulp, containing 1.9 grams of copper per liter, there is added 60 grams of cation exchange resin (Permutit Q in a hydrogen regenerated condition). After 30 minutes of loading, about 94% of the soluble copper is recovered by the resin.

The pulp containing the loaded resin is then conditioned for 5 minutes with a primary tallow amine acetate (Alamac 26 of General Mills) in an amount corresponding to 0.2 lbs. per ton of resin and a frothing agent (Dow Froth 250) in an amount corresponding to 0.1 lb. per ton of solids contained in the pulp. The conditioned pulp is then subjected to froth flotation for 5 minutes to float the loaded ion exchange resin for removal as a concentrate from the pulp. The recovery of the loaded resin by flotation is in excess of 99%.

After separation, the loaded resin is next eluted and regenerated by conventional columnar technique using 100 grams per liter of sulfuric acid to yield a concentrated solution containing 42 grams of copper per liter. At the same time, the sulfuric acid regenerates the cation exchange resin for re-use. The hydrogen regenerated cation exchange resin can be recirculated to the leached pulp for reloading with the soluble copper from the sulfuric acid solution for another cycle of flotation, elution and regeneration. The cycle can be repeated many times with the same cation exchange resin without adverse effect on the loading capacity of the resin or its flotation, elution and regeneration for copper recovery. The loading capacity remains within 0.2 lb.± of the normal loading capacity of 3.3 lb. of copper per cubic foot of the cation exchange resin.

*Example 2*

The extraction of uranium from ore containing 0.26% $U_3O_8$:

1200 grams of ore are ground in a rod mill to 25 mesh. The ground material is leached at 35% solids, and at 0.9 pH, with 80 lb. per ton of sulfuric acid and 2.0 lb. per ton of sodium chlorate (oxidant). Leaching is continued for four hours in a flotation machine. Under these conditions, about 93% of the uranium is leached as soluble uranium from the ore.

To the leached pulp containing 1.5 grams $U_3O_8$ per liter, there is added 20 grams of anion exchange resin (Amberlite IRA-400 in a nitrate regenerated condition) and the anion exchange resin is allowed to load for 30 minutes. Under these conditions, about 95% of the soluble uranium is recovered by the anion exchange resin.

The pulp containing the loaded resin is then conditioned for 5 minutes with a collector (Aero Promoter of American Cyanamid Company) in an amount corresponding to 0.2 lb. per ton of resin and a frothing agent (Dow Froth 250) in an amount corresponding to 0.1 lb. per ton of solids contained in the pulp. The conditioned pulp is then subjected to froth flotation for 5 minutes to float the loaded resin for removal as a concentrate from the pulp. Recovery of the loaded resin by flotation is in excess of 99%.

The separated loaded resin is then eluted and regenerated with a solution of 80 grams per liter ammonium nitrate, using a columnar technique, to obtain a concentrated solution containing 12 grams $U_3O_8$ per liter.

The nitrate regenerated anion exchange resin can be recirculated to the leached pulp for loading with soluble uranium.

The loading capacity of the anion exchange resin is not adversely affected by the repeated loading, flotation, elution and regeneration and thus can be recycled any number of times. The loading capacity remains within 0.2 lb.± of the normal capacity of 5.0 lb. of $U_3O_8$ per cubic foot of anion exchange resin.

Considerable economic advantages are gained by adapting ion exchange operation to a resin flotation procedure for recovering metal values from difficult-to-treat liquors and pulps. Such a process eliminates the expensive filtration, clarification, and classification steps and, by avoiding the excessive dilution of the pregnant solution associated with conventional filtration, countercurrent decantation or classification, the process enables absorption to take place from more concentrated solution than usually occurs in the typical ion-exchange and resin-in-pulp procedures. Moreover, in the exchange resin flotation processing, it is possible to use all sizes of resins including more stable and beneficial finer sizes. Additional advantages occurring are (a) more effective contact of resin with the slurry during the leaching step, resulting in the shortening of the contact time during the loading and eluting cycles and (b) saving in plant space, equipment, labor supervision and overall cost.

It is further worthy of note that the flotation of exchange resins in accordance with this invention is very rapid, clean and nearly complete, both in loaded and regenerated conditions. Moreover, experimentation has shown that the loading capacities and the elution characteristics of the resins are not adversely affected by their flotation. Such favorable characteristics of the resin flotation procedure makes the process practically and economically feasible.

In regard to the possible applications of this invention in the treatment of ores for extraction of metals, it can be stated that this resin-flotation procedure may be applicable to all the uranium ores which at present are treated by the R-I-P (resin-in-pulp) process, the solvent extraction processes and the continuous countercurrent processes (using CST Exchanger developed by Infilco Inc.). In all these cases the resin-flotation procedure will eliminate the expensive classification and clarification steps.

In the application of ion-exchange techniques for recovering metallic values from waste solutions and liquors of processes such as electroplating, anodizing, pickling and rayon manufacturing, the simple column technique cannot be utilized in most of these cases because such solutions are dirty and contain suspended solids (which plug up the resin column). This difficulty necessitates filtration of such solutions and introduces complicated flowsheet designs, all of which deters the widespread use of ion-exchange techniques in such applications. The resin-flotation procedure of this invention is applicable to such problems with considerable economic advantage.

It will be understood that various modifications may be made in the above-disclosed ore-treating process in a manner which will provide the characteristics of this invention without departing from the spirit of the invention, particularly as defined in the following claims.

I claim:

1. A process for the recovery of metal values occurring in liquors or pulps in a cationic form, comprising the steps of introducing a cationic exchange resin into the liquor or pulp containing said metal values whereby said metal ions may be adsorbed by said resin, said cationic ion-exchange resins being of the type having active sulphonate groups, adding an amount of a cationic material to said liquor or pulp, said material having an active group which reacts with said resin, said material being selected from the group consisting of the amine-type collectors and the cationic surface-active type promoters with active amine groups, and being added in amounts between .01 and 1.0 lb. per ton of resin content of said liquor or pulp, and said material being further characterized by being adapted to impart water repellency and air-avidity to said resin, floating said metal-containing resins, thereby separating said resins from said liquor or pulp, and treating the floated metal-ion bearing resins in a suitable manner to remove said metal from the resin, thereby recovering said metal values.

2. The process according to claim 1 wherein the said metal-containing resins after flotation are subjected to suitable elution and regeneration, thereby removing metal ions from said resins in a purified and concentrated form from which the said metal values are recovered by appropriate metal recovery procedures, and recirculating the said regenerated resin to the ion exchange stage of the process, thereby operating the process on a continuous basis.

3. The process according to claim 2, wherein the leaching, ion exchange and flotation steps are carried out in a continuous fashion by simultaneous dissolution of metal values, adsorption of said metal ions by ion exchange resins, flotation of metal-containing resins, elution and regeneration of said resin in another flotation circuit in order to recover the metal values in concentrated ionic form in the effluent, and recirculation of the regenerated resin to the simultaneous dissolution and adsorption stage of the process.

4. A process for the recovery of metal values occurring in liquors or pulps in an anionic form, comprising the steps of introducing an anionic exchange resin into the liquor or pulp containing said metal values whereby said metal ions may be adsorbed by said resins, said anionic resins being of the strong base quaternary amine type, adding a small but effective amount of an anionic material to said solution or pulp, said material having an active group which reacts with said resin, said material being selected from the group consisting of anionic sulphonate type collectors and anionic surface-active type promoters containing active sulphonate groups, and being added in amounts between about .01 and 1.0 lb. per ton of resin content of said liquor or pulp, and said material being further characterized by being adapted to impart water repellency and air-avidity to said resin, floating said metal-containing resins, thereby separating said resins from said liquor or pulp, and treating the floated metal-ion bearing resins in a suitable manner to remove said metal from the resin, thereby recovering said metal values.

5. The process according to claim 4 wherein the said metal-containing resins after flotation are subjected to suitable elution and regeneration, thereby removing metal ions from said resins in a purified and concentrated form from which the said metal values are recovered by appropriate metal recovery procedures, and recirculating the said regenerated resin to the ion exchange stage of the process, thereby operating the process on a continuous basis.

6. The process according to claim 5 wherein the leaching, ion exchange and flotation steps are carried out in a continuous fashion by simultaneous dissolution of metal values, adsorption of said metal ions by ion exchange resins, flotation of metal-containing resins, elution and regeneration of said resin in another flotation circuit in order to recover the metal values in concentrated ionic form in the effluent, and recirculation of the regenerated resin to the simultaneous dissolution and adsorption stage of the process.

References Cited by the Examiner

UNITED STATES PATENTS

| | | | |
|---|---|---|---|
| 2,557,361 | 6/1951 | Hazen | 209—166 |
| 2,570,119 | 10/1951 | Handley et al. | |
| 2,570,120 | 10/1951 | Handley et al. | |
| 2,742,381 | 4/1956 | Weiss et al. | |
| 2,849,279 | 8/1958 | Bailes et al. | 23—14.5 |
| 2,855,371 | 10/1958 | Abrams | 260—2.1 |
| 2,892,679 | 6/1959 | Fuentevilla. | |
| 2,961,417 | 11/1960 | Small | 260—2.1 |

FOREIGN PATENTS 1,228,589   3/1960   France.

OTHER REFERENCES

Carman: "J. of So. African Inst. of Min. and Met.," vol. 60, No. 12, July 1960, pp. 647–662.

"Chemical Week," vol. 80, No. 13, Mar. 30, 1957, pp. 73–76.

Gaudin: "Flotation," 2nd edition, 1957, pp. 182, 183, 230, 231.

Kunin: "Ion Exchange Resins," 2nd edition, 1958, pp. 5–13, 99, 208, 209, John Wiley & Sons, N.Y.C.

CARL D. QUARFORTH, *Primary Examiner.*

REUBEN EPSTEIN, *Examiner.*